(No Model.) 2 Sheets—Sheet 2.
J. R. EZZELL.
CORN AND SEED PLANTER.
No. 568,434. Patented Sept. 29, 1896.
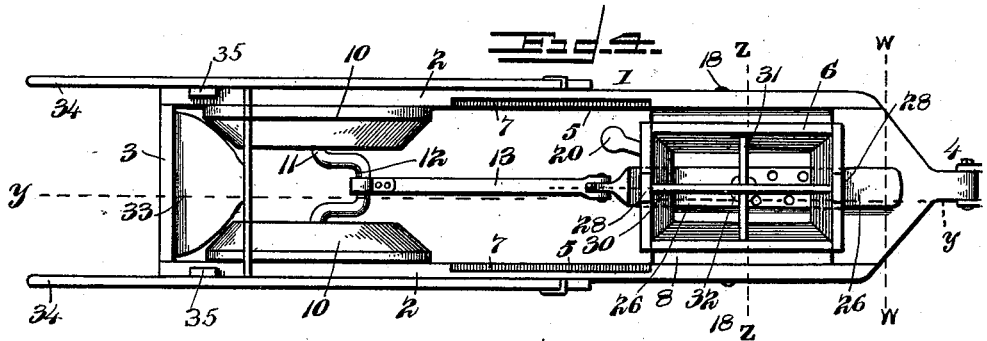
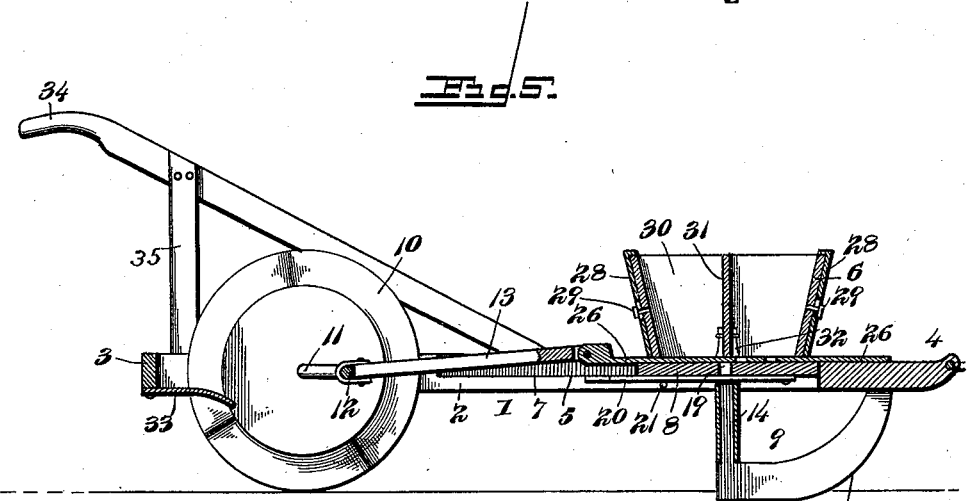
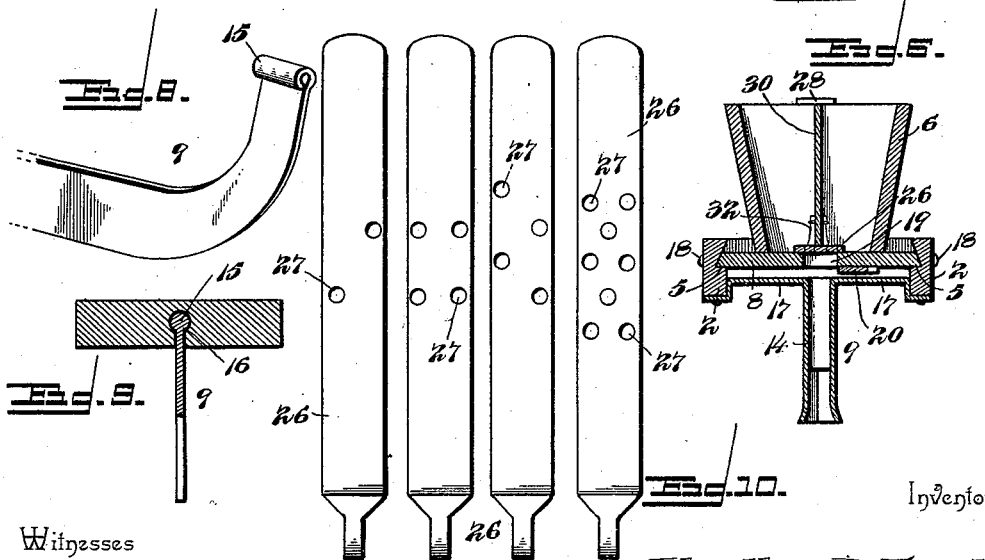
Witnesses
E. N. Stewart
V. B. Hillyard
Inventor
Johnathan R. Ezzell
By C. A. Snow & Co. Attorneys.

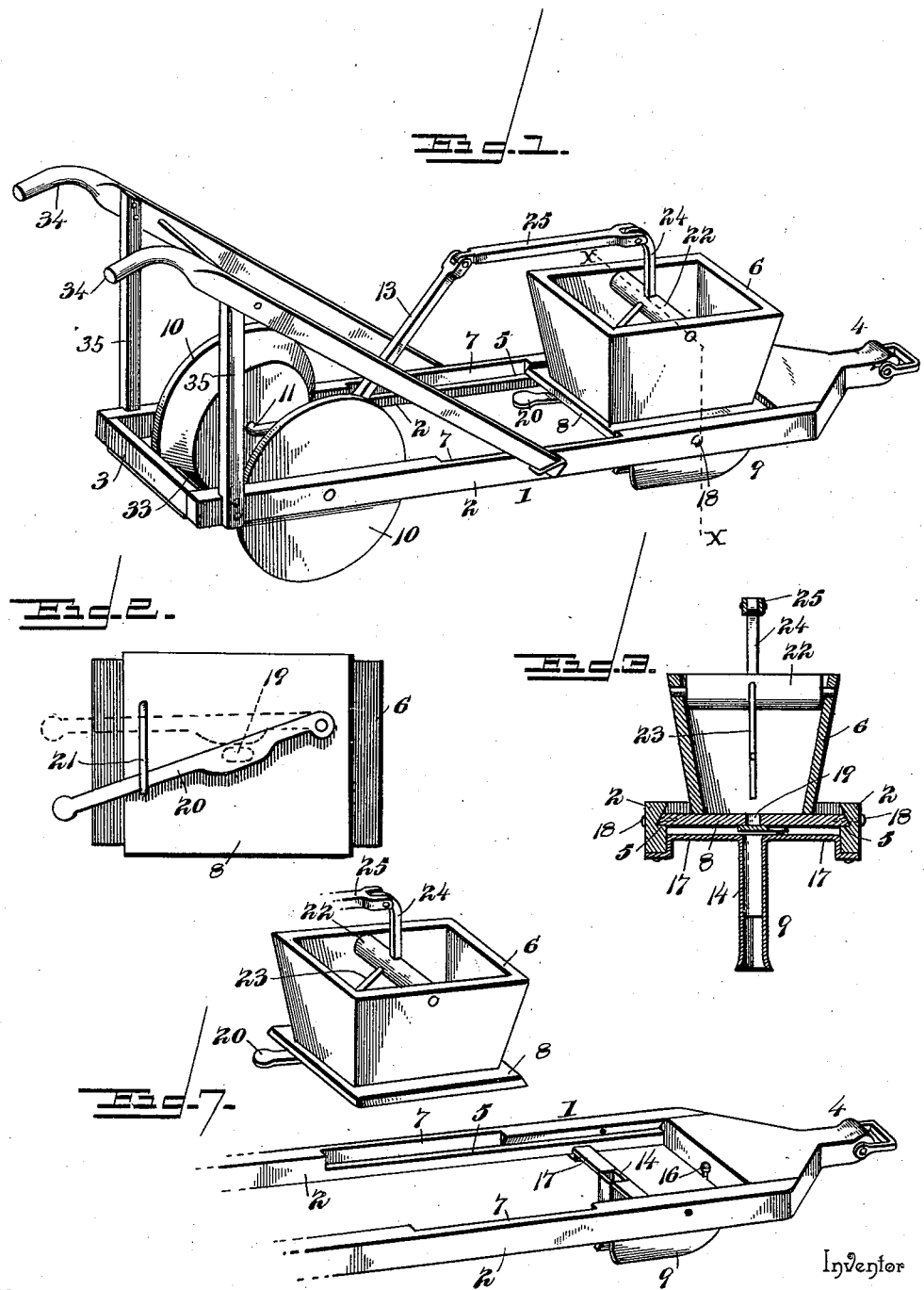

UNITED STATES PATENT OFFICE.

JONATHAN RANDLE EZZELL, OF McKENZIE, TENNESSEE.

CORN AND SEED PLANTER.

SPECIFICATION forming part of Letters Patent No. 568,434, dated September 29, 1896.

Application filed October 26, 1895. Serial No. 566,987. (No model.)

*To all whom it may concern:*

Be it known that I, JONATHAN RANDLE EZZELL, a citizen of the United States, residing at McKenzie, in the county of Carroll and State of Tennessee, have invented a new and useful Corn and Seed Planter, of which the following is a specification.

This invention relates to planters, and aims to provide a machine for sowing or drilling all kinds of seed, and which can be adjusted to drop the same kind of seed at any required distance apart or sow two kinds of seed in the same hill, or plant different seeds alternately and at any required distance apart. These several results are attained by constructing the planter with interchangeable hoppers and seed-dropping plates, the latter being provided with openings in sufficient number and at proper intervals apart, according to the nature of the work to be performed.

Obviously, from the nature of the invention and the results to be attained, the machine is susceptible of various changes in the form, proportion, and minor details of construction without sacrificing or departing from the spirit of the invention, and for a complete and thorough understanding of the nature of the improvements reference is to be had to the accompanying drawings and the subjoined description.

The improvement consists, essentially, of certain details of construction and novel combinations of parts, substantially as herein illustrated, described, and particularly claimed.

In the drawings is illustrated an embodiment of the invention, although various departures may be made and are contemplated within the scope of the invention, and in said drawings—

Figure 1 is a perspective view of a planter specially adapted for sowing cotton-seed. Fig. 2 is a bottom plan view of the cotton-seed hopper detached from the planter-frame. Fig. 3 is a transverse section about on the line *x x* of Fig. 1. Fig. 4 is a top plan view of the planter arranged for dropping various seeds, such as corn, peas, beans, &c. Fig. 5 is a longitudinal section on the line Y Y of Fig. 4. Fig. 6 is a transverse section on the line Z Z of Fig. 4. Fig. 7 is a detail perspective view showing the hopper disconnected from the planter-frame and arranged immediately above the same. Fig. 8 is a detail view of the front end of the runner. Fig. 9 is a detail section on the line W W of Fig. 4, showing the manner of connecting the runner with the front portion of the said frame. Fig. 10 shows various forms of seed-dropping plates.

Referring to the drawings, the same numerals of reference indicate similar and corresponding parts in all the figures of the drawings, and in the latter 1 denotes the frame of the machine, which is rectangular in outline and which comprises longitudinal bars 2, a rear cross-bar 3, and a clevis 4, connecting the front ends of the longitudinal bars. Grooves or ways 5 are formed in the inner or opposing sides of the longitudinal bars and extend for a length about twice the distance of the base of the interchangeable hoppers 6. Portions of the longitudinal bars are cut away, as indicated at 7, to admit of the ready removal and the placing of the hoppers in position to engage with the grooves or ways 5. These cut-away portions 7 extend from the grooves or ways 5 upwardly through the top sides of the longitudinal bars and are of a length corresponding to the length of the hopper-bases 8, so as to admit of the latter being lifted vertically from engagement with the grooves when moved to a position in register with the said cut-away portions 7.

The frame is supported at its front end upon a runner 9, and at its rear end by ground-wheels 10, secured to a crank-axle 11, which is journaled at its ends in the longitudinal bars 2, and these ground-wheels have their peripheries inwardly beveled, so as to act in the capacity of coverers and compress the loose earth upon the seed immediately after the latter has been deposited in the furrow formed by the runner. The crank portion 12 of the crank-axle comes between the ground-wheels, and the pitman 13 for transmitting motion to the seed-dropping mechanism has connection therewith.

The runner 9 is of usual formation and is spread or bifurcated at its rear end and supports the seed-spout 14, and its upper front end is enlarged, as shown at 15, so as to engage with a longitudinal groove 16, formed in the under side of the clevis 4, and which groove is enlarged at its inner or upper end to receive the enlarged portion 15 of the runner, thereby providing a simple means for the firm and positive connection of the runner with the clevis. The seed-spout is formed at its upper end with laterally-extending arms 17, which are secured at their extremities to the longitudinal bars in any approved manner.

The interchangeable hoppers 6 to all external appearance will be of similar construction, and they are detachably connected with the frame by having the edge portions of their bases engaging with the grooves or ways 5, pins 18 or suitable fastenings being provided to secure the hopper in the proper position, said pins, one or more, being passed through registering openings in the longitudinal bars and edges of the hopper-bases 8. When the hopper occupies a position opposite the cut-away portions 7, it can be detached from the frame by being lifted upward or connected therewith by being moved forward into the grooves or ways 5, as will be readily understood. An opening 19 in the base or bottom of each hopper registers with the upper end of the seed-spout, and the size of this opening may be regulated by a cut-off, which, as shown, consists of a lever 20, pivoted at one end to the base of the hopper and having its opposite end portion supported by a keeper 21, and this lever has an enlarged portion to operate over the said opening, as shown most clearly in Fig. 2. This cut-off will be employed only in connection with hoppers especially designed for planting cotton-seed, so as to regulate the quantity of seed dropped at a time. For planting cotton-seed or for dropping seed of any kind in a continuous line, the hopper will be supplied with an agitator, which latter consists of a roller 22, journaled at its ends in the sides of the hopper, near the top thereof, and having outwardly-extending prongs 23 for stirring the seed to prevent the banking thereof in the hopper. This roller has a vertically-extending arm 24, which is connected by a link 25 with the pitman 13. The parts are so proportioned that as the machine is drawn over the field the motion of the crank-axle will be transmitted to the roller 22, so as to impart a rocking or oscillatory movement thereto, thereby agitating the seed and causing a positive feed thereof through the opening 19 and seed-spout.

For planting such seed as corn, peas, beans, &c., the hopper will be supplied with a seed-dropping plate 26, which latter operates over the base 8 and through openings formed by notching the lower edges of the front and rear sides of the hopper. The seed-dropping plates will be provided with differently-related openings 27, so as to drop the seed at proper intervals apart and in such relation as may be required. The rear ends of the seed-dropping plates are connected with the pitman 13 by a knuckle-joint and receive a reciprocating motion in the operation of the machine, and to secure a close fit between the sides or walls of the hopper through which the seed-dropping plate operates, said walls or sides have fitted thereto vertically-sliding plates 28, which are adapted to have their lower ends brought into close engagement with the top side of the seed-dropping plate. These vertically-sliding plates 28 are secured in the adjusted position by binding-screws 29, which operate through longitudinal slots formed therein.

The hopper intended for planting different varieties of seeds is subdivided by a longitudinal partition 30 and a transverse partition 31 into a series of compartments, each receiving the particular seed to be planted. The transverse partition 31 is notched in its lower edge to receive the seed-dropping plate 26, and the longitudinal partition is located centrally above the said seed-dropping plate, so that a portion of the latter extends beyond each side of the longitudinal partition, and these projecting side portions are formed with openings 27 at proper distances, so as to drop different seeds in the same hill or in alternate hills, as may be required. Brushes 32 are secured to the lower portion of the transverse partition and engage with the top side of the seed-dropping plate to prevent the latter from carrying seed of one kind from one compartment into another compartment and also to insure the dislodgment of the seed from the openings 27 when the latter come opposite to the said brushes. The partitions 30 and 31 are secured together at their points of crossing or intersection and are removably fitted to the hopper, so as to be detached therefrom when it is required to plant one kind of seed, and for the latter purpose the seed-dropping plate will have one or more openings in the same straight line properly positioned according to the character of the ground and the seed to be drilled. When different kinds of seed are to be planted, the seed-dropping plate will have two sets of openings, which are located upon opposite sides of a medial line corresponding with the position of the longitudinal partition, so that the sets of openings upon opposite sides of the said longitudinal partition will receive the seed from the compartments and deposit it into the seed-spout.

A scraper 33 is attached to the rear crossbar 3, and its front end is constructed to approach close to and clear the peripheral edges of the ground-wheels of earth and other matter which may have a tendency to adhere thereto. The handles 34 are secured at their lower ends to the longitudinal bars 2 at a point about midway the length of the latter, and they are strengthened by braces 35, which are connected at their lower ends to the rear portions of the longitudinal bars 2.

The planter can be readily adapted for any required work by substituting the proper seed-dropping plate for the one not required for use, or if only one seed-dropping plate be employed the latter will be supplied with a great number of openings, and those openings not required for immediate use will be plugged or stopped in any convenient manner, thereby adapting the planter for the particular work in hand. The planting is effected in the usual manner. For dropping cotton-seed the hopper having the agitator must be substituted for that employed for general planting, and the substitution is made substantially in the manner herein set forth.

Having thus described the invention, what is claimed as new is—

1. In a planter, the combination with the frame having longitudinal bars formed with grooves in their inner sides, and having upper portions cut away and extending into the said grooves, of a hopper detachably and slidably connected with the frame and adapted to be removed and placed in position through the said cut-away portions, and provisions for securing the hopper in proper position, substantially in the manner set forth for the purpose specified.

2. In a planter, the combination of the planter-frame having a hopper provided with an escape-opening in its bottom, a clevis having a longitudinal groove in its under side which is enlarged at its inner or upper end, and a runner having its front end expanded laterally and fitted into the said groove of the clevis and supporting a seed-spout which has attachment with the planter-frame, substantially in the manner and for the purpose set forth.

In testimony that I claim the foregoing as my own I have hereto affixed my signature in the presence of two witnesses.

JONATHAN RANDLE EZZELL.

Witnesses:
J. M. McCLINTOCK,
T. M. McDONALD.